United States Patent [19]

Wade

[11] Patent Number: 4,715,783

[45] Date of Patent: Dec. 29, 1987

[54] THEFT-PROOFING DEVICE FOR OUTBOARD MOTOR PROPELLERS

[76] Inventor: Mark W. Wade, 3667 Quentin Ave., Boynton Beach, Fla. 33436

[21] Appl. No.: 941,152

[22] Filed: Dec. 12, 1986

[51] Int. Cl.[4] .......... F16B 41/00

[52] U.S. Cl. .......... 416/146 R; 416/244 B; 70/232

[58] Field of Search .......... 416/62, 146 B, 146 R, 416/247 A, 244 B; 70/232

[56] References Cited

U.S. PATENT DOCUMENTS

| | | | |
|---|---|---|---|
| 2,362,323 | 11/1944 | Stoppel | 416/247 A X |
| 3,759,076 | 9/1973 | Reese | 70/232 |
| 3,947,151 | 3/1976 | Stillerud et al. | 416/93 A |
| 3,981,165 | 9/1976 | Wersinger | 416/146 B X |
| 4,097,191 | 6/1978 | Genuardi | 416/62 X |
| 4,167,862 | 9/1979 | Gould | 416/146 B X |
| 4,257,247 | 3/1981 | Sims | 70/232 |
| 4,285,221 | 8/1981 | Atchisson | 70/232 X |
| 4,482,298 | 11/1984 | Hannon et al. | 416/245 A X |
| 4,565,533 | 1/1986 | Springer | 416/247 A X |

FOREIGN PATENT DOCUMENTS

| | | | |
|---|---|---|---|
| 1028166 | 3/1978 | Canada | 416/146 B |

*Primary Examiner*—Everette A. Powell, Jr.
*Attorney, Agent, or Firm*—Victor F. Volk

[57] ABSTRACT

A device is described with two flat bars that link around an outboard motor housing and connect to a blocking cylinder to prevent rotation or removal of a propeller.

8 Claims, 8 Drawing Figures

THEFT-PROOFING DEVICE FOR OUTBOARD MOTOR PROPELLERS

BACKGROUND OF THE INVENTION

Boat propellers are particularly liable to theft since boats are usually left unattended for long periods and in isolated places. The present invention has particular application to outboard motor propellers, which gives it a field of great usefulness, outboard motors, today, being widely found on boats of a size which formerly all had inboard motors. Typically, outboard motors include an upright drive shaft and housing aft of a boat's transom and a horizontal shaft, also protected by a housing, that mounts the propeller. The upright housing tapers down from the motor itself, and the horizontal housing takes the form of a horizontal bulge in the motor structure.

In a professional preliminary search of the Patent and Trademark Office files the following four patents were developed:

Reese, U.S. Pat. No. 3,759,076. A device hooks onto a lug in the sleeve portion of a propeller itself and covers the nut to prevent its removal. In this device the propeller can still be turned and the entire boat stolen by running the engine at low speed. Furthermore it relies on a particular propeller structure having lugs that will accept a hook. It will be shown that my structure provides much more positive protection and can be applied to a much wider range of propeller types, including those without sleeves.

Sims, U.S. Pat. No. 4,257,247. Here again, the device engages only the propeller itself to cover the nut. The whole boat could be stolen by driving the propeller slowly. This device has leg elements that extend from a point directly forward of the propeller blades aft to the end of the sleeve. It is not adjustable for different propellers and, of course, if the leg elements are too long the nut can be removed by an angle wrench.

Wersinger, U.S. Pat. No. 3,981,165. This device also engages only the propeller itself and does not keep it from turning, so that the entire boat can be stolen at slow speed. Like Sims, Wersinger's structure must apparently be custom fitted to each propeller.

Milewicz, U.S. Pat. No. 3,981,617. This is a device for a special nut with means to deny access to the cotter pin. The motor could be run to steal the boat. As shall be explained the concept here is remote from that of my invention.

SUMMARY OF THE INVENTION

I have invented a device for theft-proofing outboard motor propellers that will fit a wide range of propellers and motor sizes and will positively keep the propeller from turning, even slowly. I have invented a theft-proofing device for the propeller of an outboard motor of the type that has a substantially upright drive shaft and a housing therefor. It also has a horizontal propeller shaft and housing, the horizontal shaft supporting the propeller by means that fix the propeller to the horizontal shaft. My device comprises a pair of elongated bar means, hinge means such, advantageously, as means comprising the links of a chain, that connect together the pair of bar means, and tubular (preferably cylindrical) blocking means for blocking linear movement of the propeller, and forward projections of the blocking means that fit between and against the blades. My device also comprises support means for the tubular blocking means, that is slidably positionable on the pair of bar means and means that lock the support means in a fixed position on the pair of bar means.

Thus, when the hinge means is positioned against a forward portion of the upright shaft housing and the bars are projecting aft on either side of that housing between two of the blades but above the horizontal housing of the propeller shaft, the propeller is protected from theft, and also from rotation, when the projections of the blocking means are inserted against the blade and the locking means is locked in position on the bar means. Advantageously, my locking means may then comprise a padlock with a shackle that passes through the perforations.

My support means will advantageously comprise a base portion and two spaced-apart right-angled extensions of the base portion. These extensions define aligned slots that slidably fit the bar means and the support also comprises means fastening it to the tubular blocking means. Advantageously, also, my tubular blocking means comprises walls defining two circumferential slots through which the extensions of the support means project. By this means the support means is adjustable relative to the forward projections of the blocking means so that my device will fit either left- or right-turning propellers. To fix its support means to the blocking means at least one and preferably both of the extensions has a portion that is adjacent to the blocking means bent across its associated slot.

DETAILED DESCRIPTION OF PREFERRED EMBODIMENT

Figure 1:
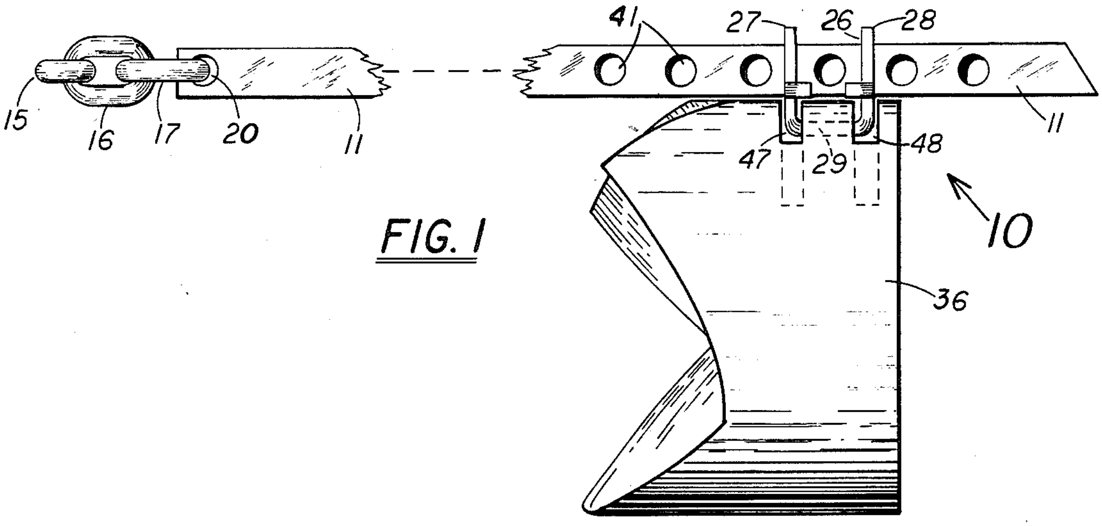
FIG. 1 shows a side view of a theft-proofing device of my invention.
Figure 2:
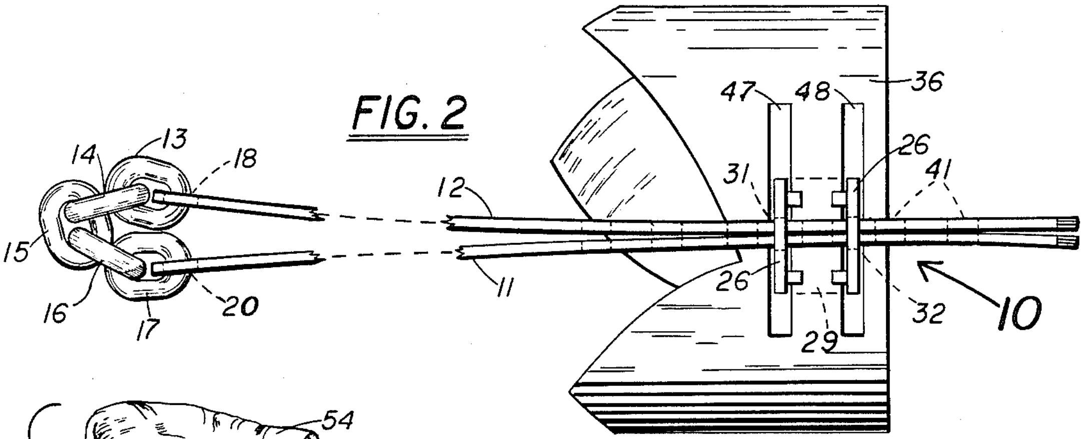
FIG. 2 shows a plan view of the device of FIG. 1.
Figure 5:
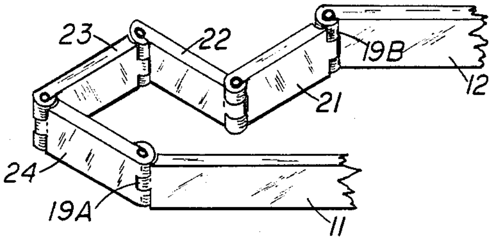
FIG. 5 shows a pictorial view of my bar means connected by hinged sections of bar.

Referring first to FIGS. 1 and 2 my device, indicated generally by the numeral 10, has a pair of elongated flat bars 11, 12 hingedly connected together by chain links 13, 14, 15, 16, 17 of which the links 13 and 17 pass through respective holes 18, 20 in the ends of the bars. My bars 11, 12 and links 13–17 have been case-hardened so that a thief cannot cut through them with a hacksaw and by providing my bars 11, 12 with hinge eyes 19A, 19B (FIG. 5) and connecting short sections 21, 22, 23, 24 of bar stock instead of chain I can form a compound hinge that is resistant to a bolt cutter. A support member 26 formed by folding up ends 27, 28 at right angles to a substantial plate 29 has aligned rectangular holes 31, 32 cut through the respective ends 27, 28 to fit the bars 11, 12 in a slide fit. The holes 31–32 are wide enough that the bars do not have to remain strictly parallel but can be angled apart to accommodate an outboard motor housing (FIG. 3).

A blocking means comprising a tube 36 is affixed to the support 26 in a manner that shall be explained. Matching perforations 41—41 dimensioned to fit the shackle of a padlock are made through the bars 11, 12.

Figure 3:
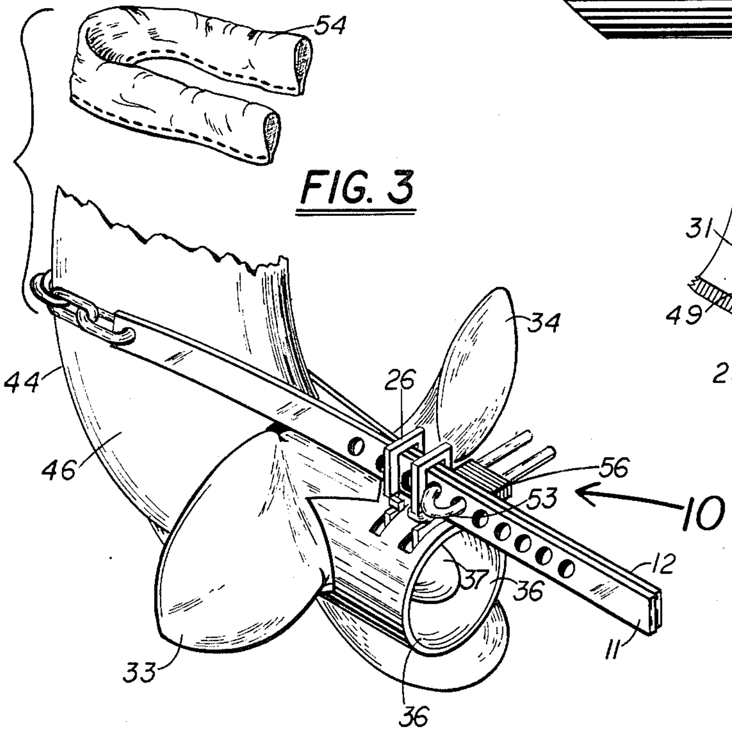
FIG. 3 shows a pictorial view of my device fitted to an outboard motor with right-turning propeller.
Figure 8:
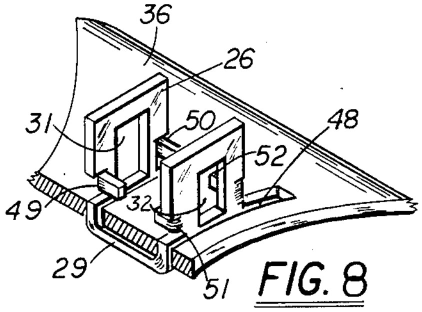
FIG. 8 shows an enlarged pictorialized section through the lines 8—8 of FIG. 6.
Figure 6:
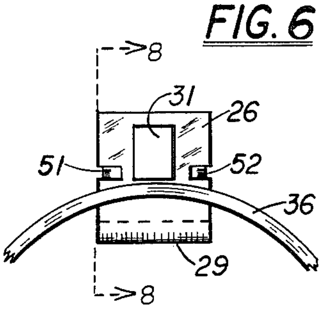
FIG. 6 shows a rear elevation of a blocking means of my device.
Figure 7:
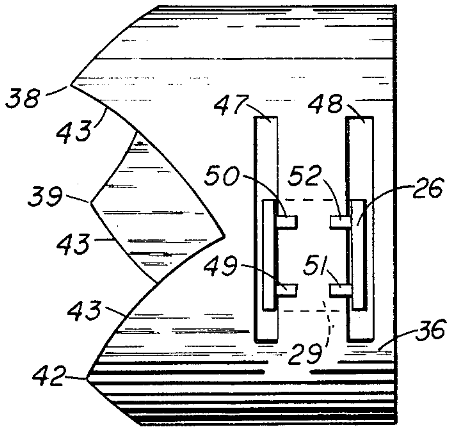
FIG. 7 shows a plan of the blocking means of FIG. 6.

As shown in FIG. 3 bars 11, 12 of my device 10 have their linking means 13-17 looped around a forward edge 44 of an upright housing 46 of an outboard motor and the bars 11, 12 are extended aft between blades 33, 34 of a propeller 37. The blocking member 36 (see also FIGS. 6 and 7) comprising a cylindrical tube with three forward pointed projections 38, 39, 42 having generally curvilinear edges 43—43 is slidably fixed to the bars 11, 12 by means of the support member 26. The blocking member 36 has parallel circumferential slots 47, 48 through which the respective ends or extensions 27, 28 of the support 26 project. Portions of the extensions 27, 28 in the form of tabs 49, 50, 51, 52 project across the slots 47, 48 to fix the support 26 to the blocking member 36 when it is not in position on the bars 11, 12.

Figure 4:
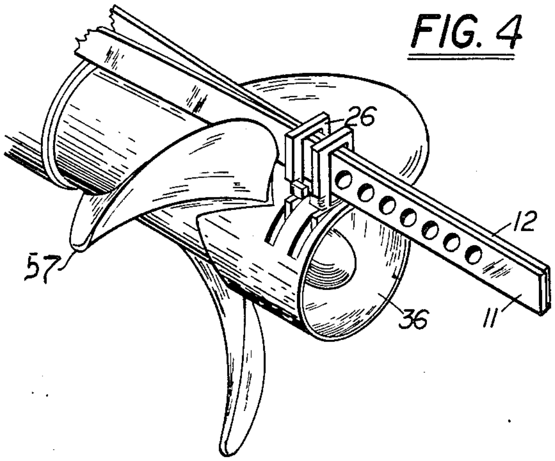
FIG. 4 shows a partial pictorial view of my device fitted to an outboard motor with a left-turning propeller.

The propeller 37 is right turning, as are most propellers on single engines, and, as shown in FIG. 3, when the bars 11, 12 pass between the blades of this propeller they fit through the holes 31, 32 when the support member 26 has been slid to the left (counterclockwise) in the slots 47, 48. But left-turning propellers are also in use, particularly with twin engines, and in the left-turning propeller 57 of FIG. 4 it can be seen that here the support 26 has been moved clockwise in the slots, which can now be seen to the left of the suport, for the bars to pass through the holes 31, 32. With the support member 26 in position on the bars 11, 12 the blocking member 36 is slid forward until its projections come between and against the propeller blades, following which a padlock shackle 53 is passed through two of the perforations 41 close against the support 26 with the links 13-17 tight against the edge 44 of the housing 46. To avoid abrasion of the motor housing I recommend the use of a leather or plastic sheath 54 over the links and the ends of the bars 11, 12 (FIG. 3). With the shackle 53 in position through the perforations its projecting ends are then snapped into a padlock 56 in a known manner.

My blocking member 36, support 26, bars 11, and 12 and links 13-17 or 21-24 are preferably steel, hardened to be resistant to cutting, and once in place, my device provides positive protection against propeller theft, particularly since the passage of the bars 11, 12 between the blades prevent a propeller from turning and any attempt to steal the whole boat by letting the propeller turn at idling speed must fail. Neither can a propeller be removed from its shaft horizontally since it is jammed forward by the projections of the blocking member 36.

The foregoing descriptin has been explanatory rather than definitive of my invention for which I desire an award of Letters Patent as defined in the appended claims.

I claim:

1. A theft-proofing device for a propeller of an outboard motor of the type having a substantially upright drive shaft and a substantially horizontal propeller shaft and housings therefor comprising:

(A) a pair of elongated bar means, (B) hinge means connecting together said pair of bar means, (C) tubular blocking means for blocking linear movement of said propeller, (D) forward projections of said blocking means, said projections fitting between and against said blades of said propeller, (E) support means for said tubular means, said support means being slidably positionable on said pair of bar means, and (F) means locking said support means in a fixed position relative to said pair of bar means whereby, said hinge means being positioned against a forward portion of said upright shaft housing with said pair of bar means projecting aft on either side thereof between said blades and above said horizontal shaft housing, said propeller shall be protected from theft or rotation when said projections of said blocking means are inserted against said blades and said locking means is locked in position on said bar means.

2. The theft-proofing device of claim 1 wherein said hinge means comprises links of chain.

3. The theft-proofing device of claim 1 wherein said bar means comprises matching perforations and said locking means comprises a padlock comprising a shackle passing through said perforations.

4. The theft-proofing device of claim 1 wherein said support means comprises a base portion, two spaced-apart, right-angled extensions of said base portion, said extensions defining aligned slots slidably fitting said bar means, and means fixing said support means to said tubular blocking means.

5. The device of claim 4 wherein said tubular blocking means comprises walls defining parallel circumferential slots and said extensions each project through an associated one of said slots whereby said support means is adjustable relative to said forward projections of said blocking means, said device thereby fitting either left- or right-turning propellers.

6. The device of claim 5 wherein at least one of said extensions comprises a portion thereof adjacent to said tubular blocking means being bent across its associated of said slots thereby fixing said support means to said tubular blocking means.

7. The device of claim 1 wherein said tubular blocking means is cylindrical.

8. The device of claim 5 wherein said tubular blocking means is cylindrical.

* * * * *